United States Patent
Chiba et al.

(10) Patent No.: US 12,395,527 B2
(45) Date of Patent: Aug. 19, 2025

(54) DETERMINATION DEVICE, DETERMINATION METHOD, AND DETERMINATION PROGRAM

(71) Applicant: NIPPON TELEGRAPH AND TELEPHONE CORPORATION, Tokyo (JP)

(72) Inventors: Daiki Chiba, Musashino (JP); Mitsuaki Akiyama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 171 days.

(21) Appl. No.: 18/023,034

(22) PCT Filed: Aug. 31, 2020

(86) PCT No.: PCT/JP2020/032935
§ 371 (c)(1),
(2) Date: Feb. 24, 2023

(87) PCT Pub. No.: WO2022/044334
PCT Pub. Date: Mar. 3, 2022

(65) Prior Publication Data
US 2023/0308478 A1    Sep. 28, 2023

(51) Int. Cl.
*H04L 9/40* (2022.01)
*H04L 61/3015* (2022.01)

(52) U.S. Cl.
CPC ...... *H04L 63/1483* (2013.01); *H04L 61/3025* (2013.01); *H04L 63/1416* (2013.01)

(58) Field of Classification Search
CPC ............. H04L 63/1483; H04L 61/3025; H04L 63/1416
See application file for complete search history.

(56) References Cited

U.S. PATENT DOCUMENTS

| | | | |
|---|---|---|---|
| 10,728,273 B1 * | 7/2020 | Okubo | H04L 61/302 |
| 10,958,668 B1 * | 3/2021 | Wang | G06F 21/554 |

(Continued)

FOREIGN PATENT DOCUMENTS

| | | | | |
|---|---|---|---|---|
| CN | 110290116 A | * | 9/2019 | G06F 16/367 |
| EP | 2 860 946 A2 | | 4/2015 | |

(Continued)

OTHER PUBLICATIONS

Chiba et al., , "Detecting Malicious Domain Names based on the Time series Analysis of Attackers Network Resources" (Year: 2015).*

International Search Report and Written Opinion mailed on Nov. 24, 2020, received for PCT Application PCT/JP2020/032935, filed on Aug. 31, 2020, 10 pages including English Translation.

(Continued)

*Primary Examiner* — Darshan I Dhruv
(74) *Attorney, Agent, or Firm* — XSENSUS LLP

(57) ABSTRACT

A specifying device receives an input of time-series information indicating an operation form of a domain name up to a predetermined date and time in time series. Then, the specifying device specifies a pattern of a time-series change in operation form of a domain name on the basis of pattern information indicating patterns of time-series change in operation form of the domain name and time-series information of an input domain name. The specifying device specifies candidates for the operation form of the domain name since the predetermined date and time using a result of the specifying. Thereafter, the specifying device determines whether or not the domain name is a target of a re-determination as to whether or not the domain name is a malicious domain name on the basis of the specified candidates for the operation form of the domain name since the predetermined date and time.

5 Claims, 10 Drawing Sheets

(56) References Cited

U.S. PATENT DOCUMENTS

| | | | | |
|---|---|---|---|---|
| 2011/0283357 | A1* | 11/2011 | Pandrangi | H04L 63/1416 726/22 |
| 2015/0106494 | A1 | 4/2015 | Bhuiyan et al. | |
| 2017/0208089 | A1* | 7/2017 | Merza | H04L 63/10 |
| 2017/0295187 | A1* | 10/2017 | Havelka | H04L 63/1441 |
| 2018/0069883 | A1* | 3/2018 | Meshi | H04L 63/1425 |
| 2018/0227321 | A1* | 8/2018 | Freund | H04L 63/1416 |
| 2018/0270254 | A1 | 9/2018 | Chiba et al. | |
| 2019/0180032 | A1* | 6/2019 | Shibahara | G06F 21/552 |
| 2020/0007564 | A1* | 1/2020 | Xie | G06Q 20/12 |
| 2020/0045077 | A1 | 2/2020 | Chiba et al. | |
| 2020/0349430 | A1* | 11/2020 | Schmidtler | G06N 3/084 |
| 2021/0014252 | A1* | 1/2021 | Usher | H04L 63/1416 |

FOREIGN PATENT DOCUMENTS

| | | |
|---|---|---|
| JP | 2015-76892 A | 4/2015 |
| JP | 6196008 B2 | 9/2017 |

OTHER PUBLICATIONS

Chiba et al., "Detecting Malicious Domain Names Based on the Time-series Analysis of Attackers Network Resources", IEICE Technical Report, vol. 115, No. 80, Jun. 4, 2015, pp. 51-56. (with English Abstract).

Hariu et al., "R&D of cyber attack countermeasure technology that supports NTT Group's security / business to confront escalating cyber attacks", NTT Technical Journal, vol. 30, No. 2, Feb. 1, 2018, pp. 19-25 (12 pages including English Translation).

Tomatsuri et al., "A Large-scale Analysis of Parked Domain Names", Information Processing Society of Japan, Available Online at: https://ipsj.ixsq.nil.ac.jp/ej/?action=pages_view_main&active_action=repository_view_main_item_detail&item_id=201420&item_no=1&page_id=13&block_id=8 https://ipsj.ixsq.nii.ac.jp/ej/?action=repository_uri&item_id=201420&file_id=1&file_no=1, Oct. 14, 2019, pp. 902-909 (16 pages including English Translation).

Daiki Chiba, et al., "DomainChroma: Building actionable threat intelligence from malicious domain names" 1 Computers & Security, Elsevier, vol. 77, Apr. 6, 2018, 24 pages, XP085485739.

* cited by examiner

Fig. 5

| SERIAL NUMBER | DOMAIN NAME | TIMESTAMP | A RECORD | NS RECORD |
|---|---|---|---|---|
| 1 | example.com | JUNE 1, 2020 | 192.0.2.1 | ns.malicious.example |
| 2 | example.com | JULY 1, 2020 | 203.0.113.1 | ns.parking.example |
| 3 | example.net | JUNE 1, 2020 | 203.0.113.2 | ns.parking.example |
| 4 | example.net | JULY 1, 2020 | 192.0.2.2 | ns.malicious.example |
| 5 | example.org | JUNE 1, 2020 | 203.0.113.3 | ns.parking.example |
| 6 | example.org | JULY 1, 2020 | 192.0.2.3 | ns.malicious.example |
| 7 | example.jp | JULY 1, 2020 | 203.0.113.4, 198.51.100.100 | ns.parking.example, ns.parking2.example |
| ... | ... | ... | ... | ... |

Fig. 6

| SERIAL NUMBER | DOMAIN NAME | DOMAIN NAME REGISTRATION DATE | DOMAIN NAME EXPIRATION DATE | ... |
|---|---|---|---|---|
| 1 | example.com | MAY 31, 2020 | MAY 31, 2021 | ... |
| 2 | example.net | MAY 31, 2020 | MAY 31, 2021 | ... |
| 3 | example.org | JUNE 15, 2020 | JUNE 15, 2021 | ... |
| 4 | example.jp | JUNE 30, 2020 | JUNE 30, 2021 | ... |
| ... | ... | ... | ... | ... |

Fig. 7

| SERIAL NUMBER | DOMAIN NAME | TIMESTAMP | ... |
|---|---|---|---|
| 1 | example.com | JUNE 1, 2020 | ... |
| 2 | example.net | JULY 1, 2020 | ... |
| 3 | example.org | JULY 1, 2020 | ... |
| ... | ... | ... | ... |

Fig. 9

| SERIAL NUMBER | DOMAIN NAME | RESULT OF SPECIFYING TIME-SERIES PATTERN IN SINGLE REGISTRATION PERIOD AT POINT IN TIME OF JULY 2, 2020 | RESULT OF SPECIFYING TIME-SERIES PATTERN IN PLURALITY OF REGISTRATION PERIODS AT POINT IN TIME OF JULY 2, 2020 | RESULT OF SPECIFYING TIME-SERIES PATTERN IN PLURALITY OF OPERATORS AT POINT IN TIME OF JULY 2, 2020 | CANDIDATES FOR TIME-SERIES PATTERN IN SINGLE REGISTRATION PERIOD AFTER JULY 3, 2020 | POSSIBILITY OF CHANGE TO OPERATION FORM OF MALICIOUS USE AFTER JULY 3, 2020 | ... |
|---|---|---|---|---|---|---|---|
| 1 | example.com | PATTERN 3 | NOT CORRESPOND | NOT CORRESPOND | PATTERNS 2, 4, 7 | HIGH | ... |
| 2 | example.net | PATTERN 2 | NOT CORRESPOND | NOT CORRESPOND | PATTERNS 3, 5, 8 | LOW | ... |
| 3 | example.org | PATTERN 9 | PATTERN b | NOT CORRESPOND | PATTERNS 3, 5, 8 | LOW | ... |
| 4 | example.jp | PATTERN 1 | NOT CORRESPOND | PATTERN A AND B | PATTERNS 2, 4, 7 | HIGH | ... |
| ... | | ... | | | | ... | |

DETERMINATION DEVICE, DETERMINATION METHOD, AND DETERMINATION PROGRAM

CROSS-REFERENCE TO RELATED APPLICATION

The present application is based on PCT filing PCT/JP2020/032935, filed Aug. 31, 2020, the entire contents of which are incorporated herein by reference.

TECHNICAL FIELD

The present invention relates to a determination device, a determination method, and a determination program.

BACKGROUND ART

In the related, as a countermeasure against websites involved in an attack, a list called a block list or blacklist in which domain names (known malicious domain names) of already identified websites for attack are listed is set for web filtering or domain name system (DNS) filtering. Further, a technology for identifying a domain name for attack (an unknown malicious domain name) that has not yet been listed by using the above-described known malicious domain name has also been proposed (see PTL 1).

Here, the domain name is not continuously operated in the same state, and use of the domain name may change, or an operation of the domain name may be temporarily stopped.

For example, there is a service called domain parking. This service is a service in which an operator displays an advertisement or the like on a domain whose operation has been temporarily stopped, and pays a part of an advertisement fee to a registrant of the domain name. Further, it is necessary to renew a contract every year to continue registration of a domain name, and when the contract is not renewed, the domain name will expire and the operation will be stopped. Thus, the domain name is not continuously operated in the same state, and the operation of the domain name changes according to convenience of a domain name registrant and a contract situation.

In order to respond to the above change and identify malicious domain names, it is necessary to determine whether or not all domain names on the Internet are malicious domain names continuously and in real time.

CITATION LIST

Patent Literature

[PTL 1] Japanese Patent No. 6196008

SUMMARY OF INVENTION

Technical Problem

However, it is difficult to determine whether any domain name on the Internet is a malicious domain name continuously and in real time with limited calculation resources. Therefore, there is a problem that it is difficult to accurately identify a malicious domain name immediately after a website is used for an attack.

Therefore, an object of the present invention is to solve the above-described problem and to immediately specify a malicious domain name accurately with limited calculation resources.

Solution to Problem

In order to solve the above problem, the present invention includes: an input unit configured to receive an input of time-series information indicating an operation form of a domain name up to a predetermined date and time in time series; a specifying unit configured to specify whether a time-series change in operation form of the input domain name corresponds to any of patterns shown in the pattern information on the basis of the time-series information of the input domain name and the pattern information indicating patterns of time-series changes in operation form of the domain name, and specify candidates for the operation form of the domain name after the predetermined date and time on the basis of the specified pattern; a determination unit configured to determine whether or not there is a possibility that the operation form of the domain name will change to malicious use on the basis of the specified candidates for the operation form of the domain name after the predetermined date and time; and an output unit configured to output a result of the determination.

Advantageous Effects of Invention

According to the present invention, it is possible to immediately specify a malicious domain name accurately with limited calculation resources.

BRIEF DESCRIPTION OF DRAWINGS

FIG. 5 is a diagram illustrating an example of a DNS data set.

FIG. 6 is a diagram illustrating an example of registration information of a domain name.

FIG. 7 is a diagram illustrating an example of a blacklist of domain names.

FIG. 9 is a diagram illustrating an example of a result of specifying processing in the specifying device.

DESCRIPTION OF EMBODIMENTS

Hereinafter, modes for carrying out the present invention (embodiments) will be described with reference to the drawings. The present invention is not limited to the present embodiment.

(Overview)

First, an overview of a specifying device (determination device) of the present embodiment will be described with reference to FIGS. 1 to 3. For example, the specifying device determines when the domain name is a domain name needing a re-determination as to whether or not the domain name is a malicious domain name on the basis of the time-series information indicating time-series changes in operation form such as use of an input domain name for domain parking or malicious use. For example, the specifying device specifies a pattern of changes in operation form of the domain name on the basis of a temporal relationship between the use of the domain name for the domain parking and the malicious use. The specifying device determines whether or not there is a possibility that the domain name will change to a malicious domain name after a predetermined date and time on the basis of the specified pattern.

Figure 1:
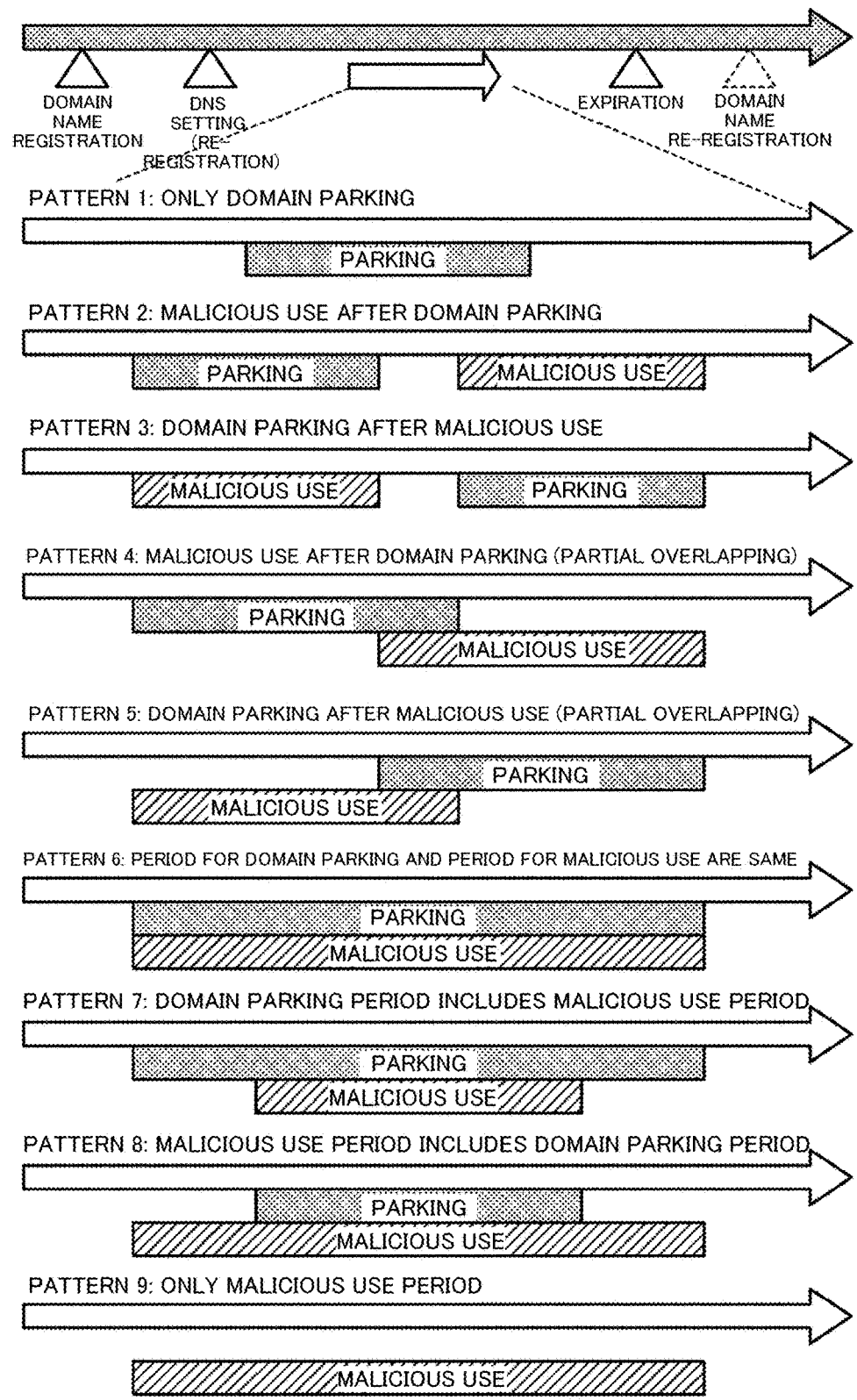
FIG. 1 is a diagram illustrating an example of a time-series pattern of changes in operation form of a domain name in a period from registration of the domain name to expiration of the domain name.

For example, as illustrated in FIG. 1, a temporal relationship between the use of domain parking (parking) and the malicious use between the registration (or re-registration) of the domain name and the expiration of the domain name after the setting of the DNS corresponds to any one of patterns 1 to 9. Among these, patterns 2, 4 and 7 are patterns in which change to malicious use occurs after the use for domain parking. Therefore, when the temporal relationship between the use of the domain name for domain parking and the malicious use corresponds to patterns 2, 4 and 7, the specifying device determines that there is a possibility that the domain name will change to the malicious domain name after the predetermined date and time.

Further, it is known that a drop catch performed by a third party after the domain name expires is often used in cyber attacks. In view of this, the specifying device also checks the change in operation form of the domain name before and after the re-registration with respect to the domain name of which re-registration has occurred.

Figure 2:
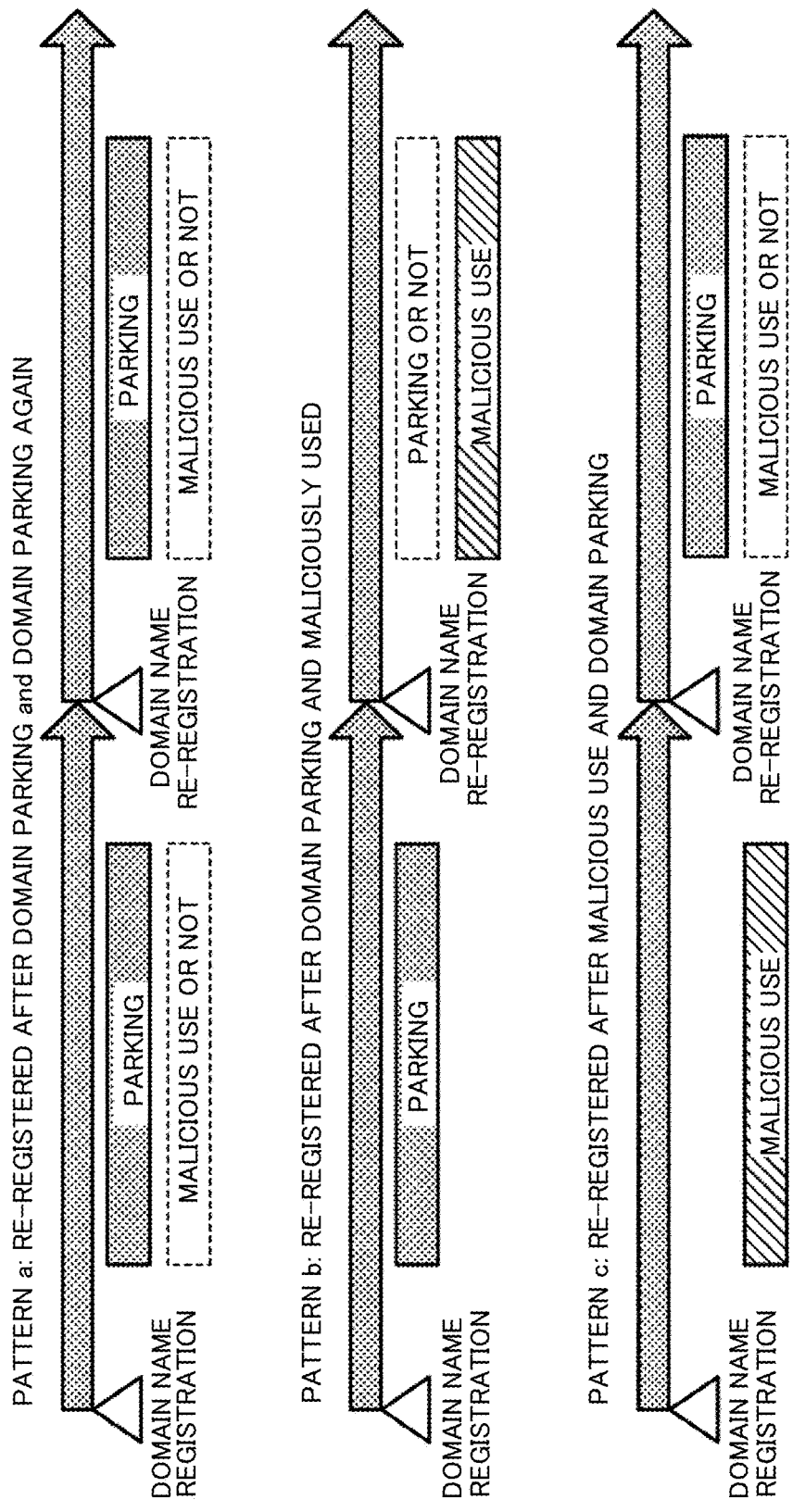
FIG. 2 is a diagram illustrating an example of a time-series pattern of changes in operation form of a domain name before and after re-registration of the domain name.

For example, as illustrated in FIG. 2, a temporal relationship between the use and the malicious use of domain parking before and after the re-registration of the domain name corresponds to any one of patterns a to c. Among these, for example, patterns a and c may be maliciously use of a drop catch of a domain name. Therefore, when the temporal relationship between the use and the malicious use of domain parking before and after the re-registration of the domain name corresponds to patterns a and c, the specifying device determines that there is a possibility that the domain name will change to the malicious domain name after the predetermined date and time.

Further, even when the domain name is used for a plurality of instances of domain parking at the same time or while switching, there is a possibility of the malicious use. Therefore, when the domain name is used for a plurality of instances of domain parking at the same time or while switching (for example, when an operator of the domain parking changes as in patterns A, B, and C illustrated in FIG. 3), the specifying device determines that there is a possibility that the domain name will change to a malicious domain name after a predetermined date and time.

The specifying device can specify the domain name having a possibility of change to a malicious domain name after a predetermined date and time by specifying the pattern of change in operation form of the domain name as described above. As a result, the specifying device can immediately specify the malicious domain name accurately with limited calculation resources.

Configuration Example

Figure 4:
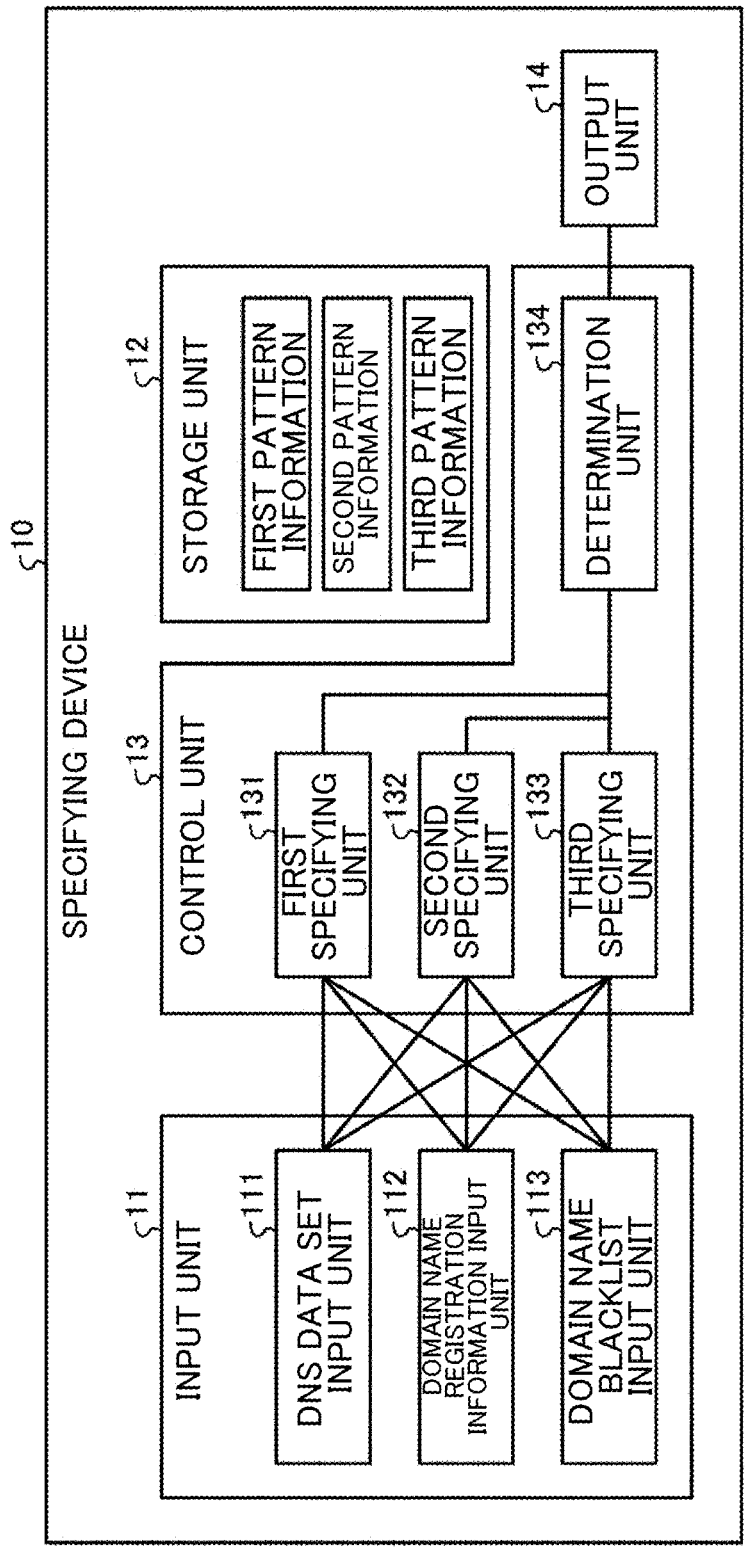
FIG. 4 is a diagram illustrating a configuration example of a specifying device.

FIG. 4 is a diagram illustrating an example of a configuration of the specifying device 10. As illustrated in FIG. 4, the specifying device 10 includes an input unit 11, a storage unit 12, a control unit 13, and an output unit 14.

The input unit 11 receives an input of data that is used when the control unit 13 performs various types of processing. For example, the input unit 11 receives an input of time-series information indicating the operation form of each domain name in time series. The time-series information is, for example, a DNS data set (see FIG. 5), registration information of a domain name (see FIG. 6), a blacklist of domain names (see FIG. 7), and the like. Details of this DNS data set, the registration information of the domain name, and the blacklist of domain names will be described below using drawings.

The storage unit 12 stores data that is used when the control unit 13 performs various types of processing. The control unit 13 controls the entire specifying device 10. For example, the control unit 13 specifies a pattern of changes in operation form of each domain name, and determines whether or not there is a possibility that each domain name will change to a malicious domain name after a predetermined date and time on the basis of the specified pattern of changes in operation form (time-series pattern). The output unit 14 outputs a processing result of the control unit 13.
(Input Unit)

The input unit 11 includes a DNS data set input unit 111, a domain name registration information input unit 112, and a domain name input blacklist unit 113.

The DNS data set input unit 111 receives an input of the DNS data set. The DNS data set is information indicating a host name of a name server (NS) that manages the domain name, a date and time (time stamp) at which the host name of the NS has been confirmed, and the like for each domain name.

FIG. 5 is a diagram illustrating an example of the DNS data set. For example, data of serial number 1 of the DNS data set illustrated in FIG. 5 indicates that an IPv4 address (A record) of the domain name "example.com" on Jun. 1, 2020, is "192.0.2.1", and a host name of NS (NS record) is "ns.malicious.example". Further, data of serial number 2 indicates that the A record of the domain name "example.com" on Jul. 1, 2020, is "203.0.113.1", and the NS record is "ns.parking.example".

Further, it is assumed that the NS records "ns.parking.example" and "ns.parking2.example" in the DNS data set are respective NS records designated by the parking operators, and are owned by different parking operators.

For example, data of serial number 7 indicates that the NS records of the domain name "example.jp" on Jul. 1, 2020, are "ns.parking.example" and "ns.parking2.example", and "example.jp" is used for domain parking of a plurality of parking operators.

The domain name registration information input unit 112 in FIG. 4 receives an input of the registration information of the domain name. The registration information of the domain name is information indicating a registration date and an expiration date (scheduled expiration date in a case in which registration is not continued) of the domain name for each domain name.

FIG. 6 is a diagram illustrating an example of the registration information of the domain name. For example, data of serial number 1 of the registration information of the domain name illustrated in FIG. 6 indicates that a registration date of a domain name "example.com" is May 31, 2020, and an expiration date of the domain name is May 31, 2021. This registration information of the domain name may include information on a registrant of the domain name.

The domain name input blacklist unit 113 in FIG. 4 receives an input of the blacklist of the domain names (a list of malicious domain names). FIG. 7 is a diagram illustrating an example of a blacklist of domain names. For example, data of serial number 1 of the blacklist of domain names illustrated in FIG. 7 indicates that the domain name "example.com" was listed in the blacklist of domain names at a point in time of Jun. 1, 2020.

It is assumed that the DNS data set illustrated in FIG. 5, the registration information of the domain name illustrated in FIG. 6, and the blacklist of domain names illustrated in FIG. 7 are updated once a day, but a frequency of this update is not limited to the above frequency.

(Storage Unit)

Next, the storage unit 12 of FIG. 4 will be described. The storage unit 12 stores first pattern information, second pattern information, and third pattern information.

(First Pattern Information)

The first pattern information is information indicating a time-series pattern for a single period (life cycle) from registration of a domain name to expiration of the domain name. An example of this first pattern information is illustrated in FIG. 1.

The example of FIG. 1 shows an example of nine time-series patterns that can be time-series changes in two operation forms including (1) an operation using domain parking and (2) an operation for malicious activity (malicious use) as operation forms of the domain name.

Pattern 1 is a time-series pattern in which a domain name is used only for domain parking within a designated period of a certain life cycle and is not used maliciously.

Pattern 2 is a time-series pattern in which a domain name is used for domain parking and then used maliciously after a period (malicious use after domain parking).

Pattern 3 is a time-series pattern in which a domain name is used maliciously and then used for domain parking after a period (domain parking after malicious use).

Pattern 4 is a time-series pattern in which malicious use starts after start of use of domain parking and before end of use of domain parking, and the use periods partially overlap (malicious use after domain parking (partial overlapping)).

Pattern 5 is a time-series pattern in which use of domain parking starts after start of malicious use and before end of malicious use, and the use periods partially overlap (domain parking after malicious use (partial overlapping)).

Pattern 6 is a time-series pattern in which a period in which a domain name is used for domain parking and a period in which a domain name is used for malicious use are the same.

Pattern 7 is a time-series pattern in which a period in which a domain name is used for domain parking includes the period in which a domain name is used for malicious use.

Pattern 8 is a time-series pattern in which the period in which a domain name is used for malicious use includes a period in which a domain name is used for domain parking.

Pattern 9 is a time-series pattern for malicious use only.

It is possible to determine whether or not a target domain name is used for domain parking, for example, on the basis of matching the NS record corresponding to the domain name with parking information obtained in advance in the registration information of the domain name (see FIG. 6). Further, it is possible to determine whether or not the target domain name is used maliciously, for example, by referring to the blacklist information of the domain names (see FIG. 7).

(Second Pattern Information)

Next, the second pattern information will be described. The second pattern information is information indicating a pattern of changes in operation form of the domain name before and after the re-registration of the domain name. An example of this second pattern information is illustrated in FIG. 2.

Pattern a is a time-series pattern in which a domain name used for domain parking expires, is re-registered, and then is used again for domain parking. In the pattern, it does not matter whether or not the domain name is used maliciously before or after the re-registration of the domain name.

Pattern b is a time-series pattern in which a domain name used for domain parking expires, is re-registered, and then is used maliciously. In the pattern, it does not matter whether or not the domain name is used for domain parking after re-registration.

Pattern c is a time-series pattern in which a maliciously used domain name expires, is re-registered, and then is used for domain parking. In the pattern, it does not matter whether or not a domain name is used maliciously after re-registration.

(Third Pattern Information)

Next, the third pattern information will be described. The third pattern information is information indicating a pattern of time-series changes in the operation form when the domain name is operated at the same time or while switching between a plurality of name servers (a plurality of domain parking operators).

Generally, when the domain parking operator is different, a value of the NS record indicating the operator is also different. Therefore, for example, when there are a plurality of NS records corresponding to the same domain name in the DNS data set (see FIG. 5), it is possible to specify the domain name as a domain name that is using a plurality of domain parking operators. An example of this third pattern information is illustrated in FIG. 3.

Figure 3:
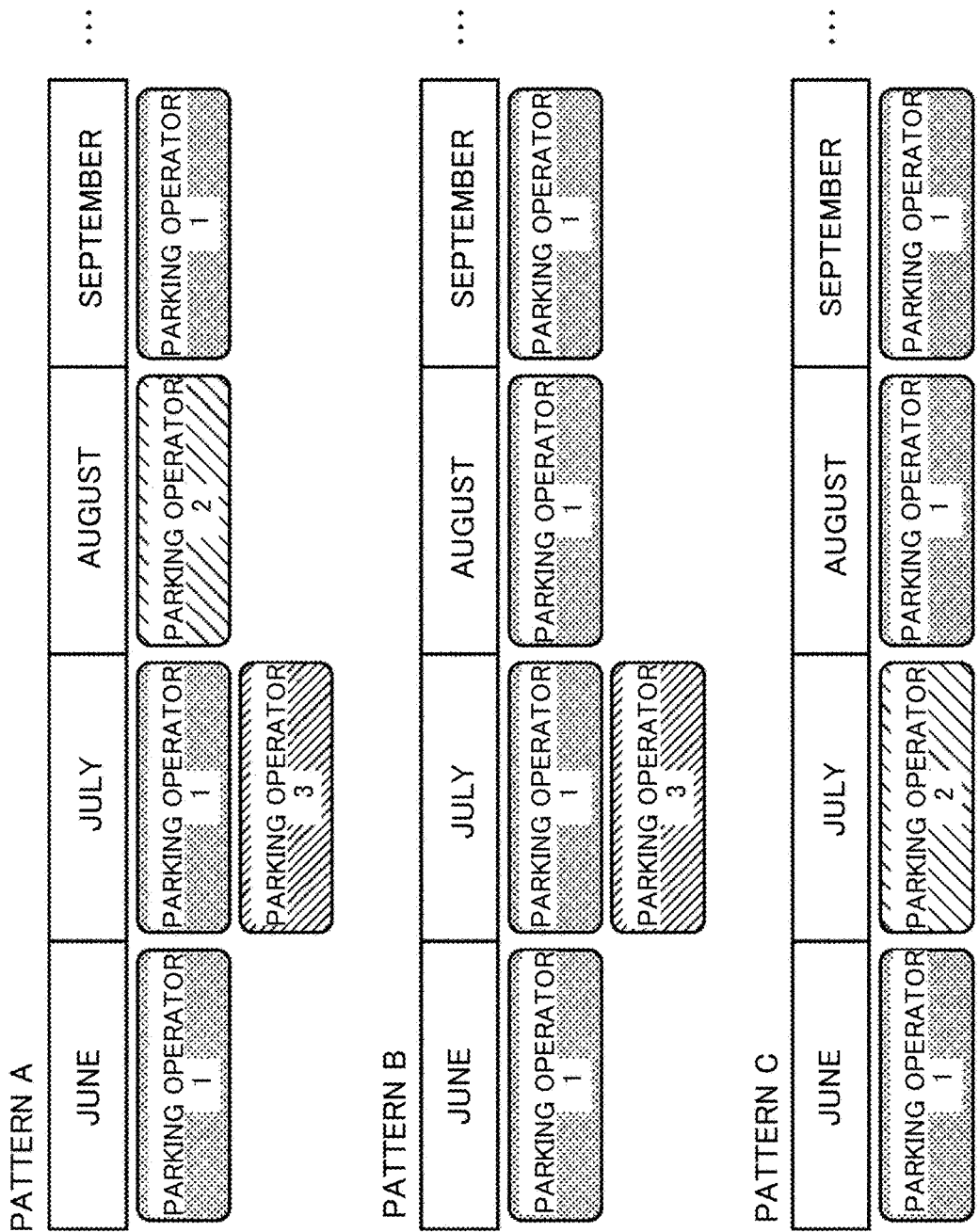
FIG. 3 is a diagram illustrating an example of a time-series pattern of changes in operation form of a domain name when the domain name is operated by a plurality of operators.

In the example of FIG. 3, as operation forms of the domain name, three conceivable time-series patterns are shown as time-series changes in which a domain parking operation using a plurality of domain parking operators is assumed.

Pattern A is a time-series pattern in which a plurality of domain parking operators are used at the same time or while switching. Pattern B is a time-series pattern in which a plurality of domain parking operators are used at the same time. Pattern C is a time-series pattern in which a plurality of domain parking operators are used while switching.

(Control Unit)

Next, the control unit 13 of FIG. 4 will be described. The control unit 13 includes a first specifying unit 131, a second specifying unit 132, a third specifying unit 133, and a determination unit 134.

The first specifying unit 131 specifies a time-series pattern of the operation form of the domain name in a period from registration of the domain name to expiration of the domain name on the basis of the time-series information of the domain name and the first pattern information. The first specifying unit 131 specifies candidates for the operation form of the domain name since a predetermined date and time (for example, a present point in time) on the basis of a result of the specifying.

The second specifying unit 132 specifies the time-series pattern of change in operation form of the domain name before and after the re-registration of the domain name when re-registration of the domain name has been performed after the expiration of the domain name, on the basis of the time-series information of the domain name and the second pattern information. The second specifying unit 132 specifies candidates for the operation form of the domain name since the predetermined date and time (for example, the present point in time) on the basis of a result of the specifying.

The third specifying unit 133 determines whether or not the domain name has been used by a plurality of domain parking operators on the basis of the time-series information of the domain name and the third pattern information, or specifies, for example, the time-series pattern of change in operation form of the domain name when the domain name has been used by the plurality of domain parking operators. The third specifying unit 133 specifies the candidates for the operation form of the domain name since the predetermined date and time (for example, the present point in time) on the basis of a result of the specifying.

The determination unit 134 determines whether or not there is a possibility of change in operation form of the domain name to malicious use, on the basis of the candidates for the operation form of the domain name since the predetermined date and time, which have been specified by the first specifying unit 131, the second specifying unit 132, and the third specifying unit 133.

For example, when the candidates for the operation form of the domain name since the predetermined date and time (for example, the present point in time) specified by the first specifying unit 131 are patterns 2, 4, and 7 illustrated in FIG. 1, the determination unit 134 determines there is a possibility that the operation form of the domain name changes to malicious use since the predetermined date and time.

Further, for example, when the candidates for the operation form of the domain name since the predetermined date and time (for example, the present point in time), which have been specified by the second specifying unit 132, are patterns a and c illustrated in FIG. 2, the determination unit 134 determines that there is a possibility of change in the operation form of the domain name to malicious use since the predetermined date and time.

Further, for example, when the operation form of the domain name specified by the third specifying unit 133 is an operation form in which the domain name is operated at the same time or while switching between a plurality of name servers, the determination unit 134 determines that there is a possibility that the operation form of the domain name changes to malicious use since the predetermined date and time.

It is assumed that the time-series pattern of the operation form having a possibility that the operation form of the domain name changes to malicious use since the predetermined date and time among the patterns (time-series patterns) shown in the first pattern information, the second pattern information, and the third pattern information described above is stored in the storage unit 12, for example.

Further, although not illustrated herein, the specifying device 10 may further include a processing unit that performs processing for determining whether or not the domain name is maliciously used when it is determined that there is a possibility that the operation form of the input domain name will change to malicious use since the predetermined date and time.

Example of Processing Procedure

Figure 8:
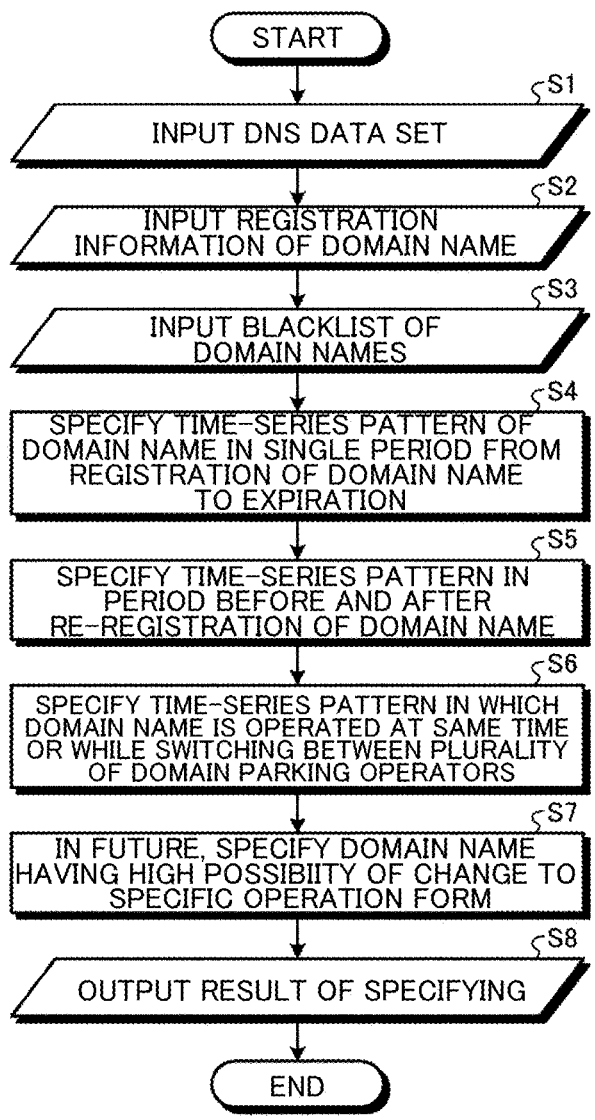
FIG. 8 is a flowchart illustrating an example of a processing procedure of the specifying device.
Figure 10:
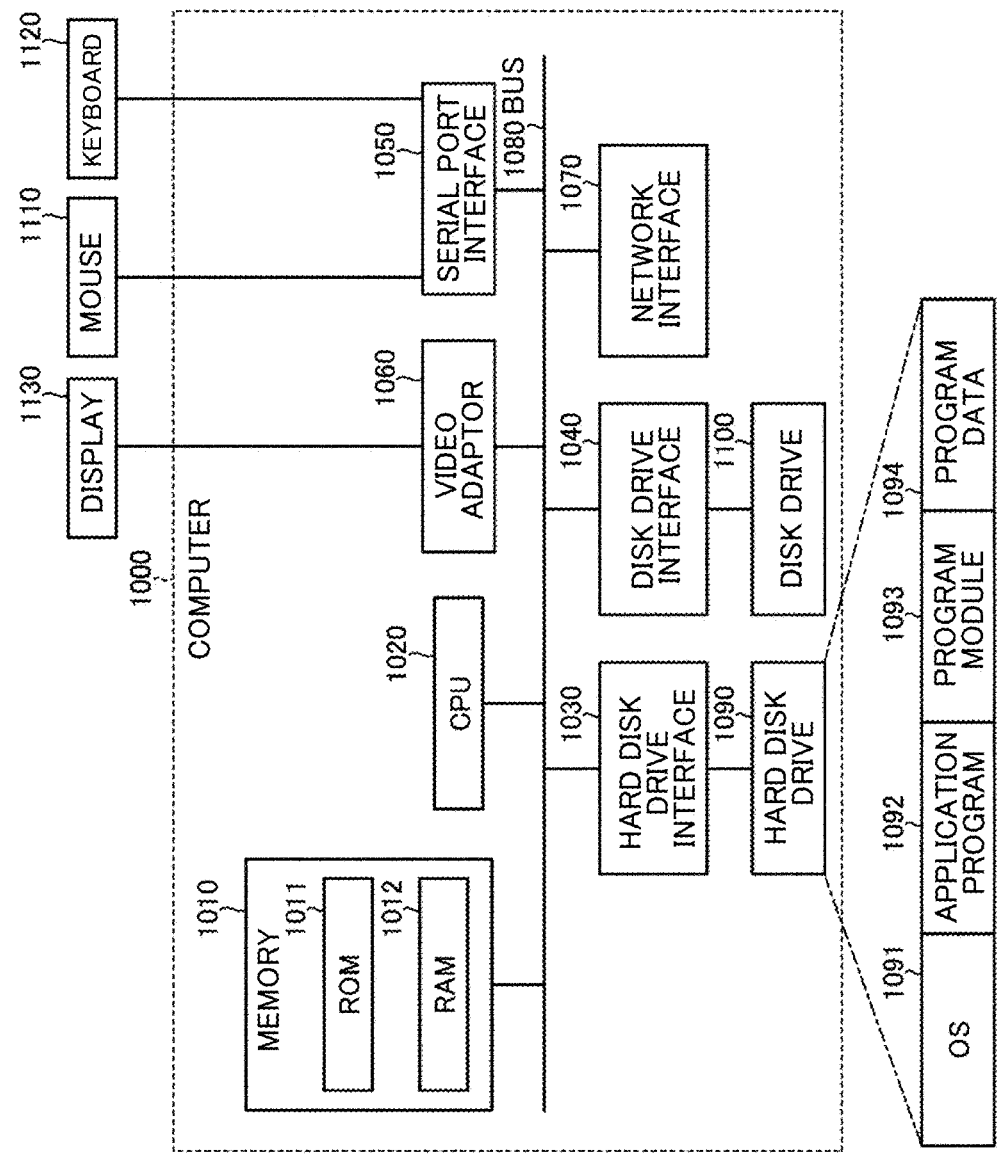
FIG. 10 is a diagram illustrating an example of a computer that executes a program.

Next, an example of a processing procedure of the specifying device 10 will be described with reference to FIG. 8. First, the DNS data set input unit 111 of the specifying device 10 receives the input of the DNS data set (S1). Further, the domain name registration information input unit 112 receives the input of the registration information of the domain name (S2). Further, the domain name input blacklist unit 113 receives the input of the blacklist of domain names (S3).

Thereafter, the first specifying unit 131 specifies the time-series pattern of change in operation form of the domain name as a target on the basis of the first pattern information, the DNS data set, the registration information of the domain name, and the blacklist of domain names, in a single period from the registration of the domain name to the expiration of the domain name (S4).

Further, the second specifying unit 132 specifies the time-series pattern of the change in operation form of the domain name in the period before and after the re-registration of the domain name on the basis of the second pattern information, the DNS data set, the registration information of the domain name, and the blacklist of domain names (S5).

Further, the third specifying unit 133 specifies the time-series pattern in which a plurality of domain parking operators are operated at the same time or while switching on the basis of the third pattern information, the DNS data set, the registration information of the domain name, and the blacklist of domain names (S6).

Thereafter, the determination unit 134 specifies a domain name having a high possibility of change to a specific operation form (for example, malicious use) in the future on the basis of the time-series pattern of the operation of the domain name in S4 to S6 above (S7). Thereafter, the determination unit 134 outputs the result of the specifying in S7 via the output unit 14 (S8).

By doing so, the specifying device 10 can specify a domain name having a possibility of change to a specific operation form (for example, malicious use) in the future, that is, a domain name for which it is necessary to re-determine whether or not the domain name is a malicious domain name.

Concrete Example

Next, a specific example of processing that is executed by the specifying device 10 will be described. FIG. 9 is a diagram illustrating an example of specifying a domain name in the specifying device 10.

(Specifying Regarding "example.com" at Point in Time of Jul. 2, 2020)

An example of specifying regarding "example.com" at a point in time of Jul. 2, 2020 in serial number 1 in FIG. 9 will be described. For example, referring to the DNS data set in FIG. 5, "example.com" has the NS record "ns.malicious.example" that is not domain parking set on Jun. 1, 2020, and the NS record "ns.parking.example" of domain parking set on Jul. 1, 2020. From this, the specifying device 10 determines that "example.com" is used for domain parking of a certain type of operator from Jul. 1, 2020.

Further, referring to the blacklist of domain names in FIG. 7, "example.com" was listed on the blacklist (maliciously used) on Jun. 1, 2020, but subsequent malicious use is not confirmed. Further, referring to the registration information of the domain name in FIG. 6, "example.com" was registered on May 31, 2020, and is not expired at a point in time of Jul. 2, 2020. Therefore, the specifying device 10 determines that only a single life cycle (single registration period) needs to be considered for "example.com".

From the above information, the specifying device 10 determines that the time-series pattern of the operation form of "example.com" corresponds to a time-series pattern in which the domain name is maliciously used and then used for domain parking (pattern 3 illustrated in FIG. 1).

Referring to the registration information of the domain name in FIG. 6, re-registration of the domain name of "example.com" has not occurred. Therefore, the specifying device 10 determines that "example.com" does not correspond to, for example, a time-series pattern (time-series pattern in a plurality of registration periods) of changes in the operation form before and after the re-registration of the domain name as illustrated in FIG. 2.

Further, referring to the DNS data set in FIG. 5, "example.com" is not used for domain parking of a plurality of operators. Therefore, the specifying device 10 determines that "example.com" does not correspond to the time-series pattern in which the domain name is used for the domain parking of the plurality of operators as illustrated in FIG. 3, for example.

(Specifying Regarding "example.com" after Jul. 3, 2020)

Further, the specifying device 10 specifies an applicable time-series pattern with respect to the operation form of "example.com" after Jul. 3, 2020. As described above, "example.com" has been used for domain parking since Jul. 1, 2020. Therefore, the specifying device 10 specifies candidates for the applicable time-series pattern as patterns 2, 4, and 7 in FIG. 1 with respect to the operation form from Jul. 3, 2020 to the expiration of the domain name.

The specifying device 10 determines that a possibility that "example.com" will change to the operation form of malicious use after Jul. 3, 2020 is relatively "high" on the basis of a result of the specifying. Therefore, the specifying device 10 determines that it is necessary to confirm whether or not "example.com" is a malicious domain name more frequently than other domain names.

For the determination as to whether or not the domain name is maliciously used (malicious operation), for example, it is conceivable that the method described in PTL 1 is used, but the present invention is not limited thereto.

(Specifying Regarding "example.net" at Point in Time of Jul. 2, 2020)

Next, an example of specifying regarding "example.net" at a point in time of Jul. 2, 2020 in serial number 2 in FIG. 9 will be described.

For example, referring to the DNS data set in FIG. 5, "example.net" has the domain parking NS record "ns.parking.example" set on Jun. 1, 2020, and the NS record "ns.malicious.example" that is not the domain parking set on Jul. 1, 2020.

Further, referring to the blacklist of domain names in FIG. 7, "example.net" was listed (maliciously used) on the blacklist on Jul. 1, 2020.

Further, referring to the registration information of the domain name in FIG. 6, "example.net" was registered on May 31, 2020, and is not expired at a point in time of Jul. 2, 2020. Therefore, the specifying device 10 determines that only a single life cycle needs to be considered for "example.com".

From the above information, the specifying device 10 determines that the time-series pattern of the operation form of "example.net" at a point in time of Jul. 2, 2020 is the time-series pattern in which the domain name is used for domain parking and then maliciously used (pattern 2 illustrated in FIG. 1).

In the specifying device 10, referring to the registration information of the domain name in FIG. 6, re-registration of the domain name of "example.net" does not occur. Therefore, the specifying device 10 determines that "example.net" does not correspond to the time-series pattern (time-series pattern in a plurality of registration periods) of the operation form before and after the re-registration of the domain name as illustrated in FIG. 2.

Referring to the DNS dataset of FIG. 5, "example.net" is not used for domain parking of a plurality of operators. Therefore, the specifying device 10 determines that "example.net" does not correspond to the time-series pattern in which the domain name is used for the domain parking of the plurality of operators as illustrated in FIG. 3, for example.

(Specifying Regarding "example.net" after Jul. 3, 2020)

Further, the specifying device 10 specifies an applicable time-series pattern with respect to the operation form of "example.net" after Jul. 3, 2020. As described above, "example.net" has a record of malicious use on Jul. 1, 2020. Therefore, the specifying device 10 specifies candidates for the applicable time-series pattern as patterns 3, 5, 8 and 9 in FIG. 1 with respect to the operation form from Jul. 3, 2020 to the expiration of the domain name.

The specifying device 10 determines that a possibility that "example.net" will change to the operation form of malicious use after Jul. 3, 2020 is relatively "low" on the basis of a result of the specifying. Therefore, the specifying device 10 determines that it is not necessary to confirm whether or not "example.net" is a malicious domain name more frequently than other domain names.

(Specifying Regarding "example.org" at Point in Time of Jul. 2, 2020)

Next, an example of specifying regarding "example.net" at a point in time of Jul. 2, 2020 in serial number 3 in FIG. 9 will be described.

For example, referring to the registration information of the domain name in FIG. 6 and the DNS data set in FIG. 5, "example.org" was re-registered on Jun. 15, 2020 and not expired at a point in time of Jul. 2, 2020. Therefore, the specifying device 10 determines that "example.org" corresponds to the time-series pattern (time-series pattern in a plurality of registration periods) of the operation form before and after the re-registration of the domain name as illustrated in FIG. 2.

For example, referring to the DNS data set in FIG. 5, "example.org" has the domain parking NS record "ns.parking.example" set on Jun. 1, 2020 before re-registration, and the NS record "ns.malicious.example" that is not the domain parking set on Jul. 1, 2020 after re-registration. Further, referring to the blacklist of domain names in FIG. 7, "example.org" was listed (maliciously used) since Jul. 1, 2020 after re-registration.

From the above information, the specifying device 10 determines that the time-series pattern of the operation form of "example.org" at a point in time of Jul. 2, 2020 is the pattern 9 illustrated in FIG. 1.

Further, as described above, "example.org" is subjected to re-registration of a domain name, is used for domain parking before the re-registration of the domain name (before expiration), and is maliciously used after the re-registration. Therefore, the specifying device 10 specifies the time-series pattern before and after the re-registration of "example.org" as the pattern b in FIG. 2.

Referring to the DNS data set in FIG. 5, "example.org" is not used for domain parking of a plurality of operators. Therefore, the specifying device 10 determines that "example.org" does not correspond to the time-series pattern in which the plurality of operators as illustrated in FIG. 3 are used, for example.

[Specifying Regarding "example.org" after Jul. 3, 2020]

Further, the specifying device 10 specifies an applicable time-series pattern with respect to the operation form of "example.org" after Jul. 3, 2020. As described above, "example.net" has a record of malicious use on Jul. 1, 2020. Therefore, the specifying device 10 specifies candidates for the applicable time-series pattern as patterns 3, 5, 8 and 9 in FIG. 1 with respect to the operation form from Jul. 3, 2020 to the expiration of the domain name.

The specifying device 10 determines that a possibility that "example.org" will change to the operation form of malicious use after Jul. 3, 2020 is relatively "low" on the basis of a result of the specifying. Therefore, the specifying device 10 determines that it is not necessary to confirm whether or not "example.org" is a malicious domain name more frequently than other domain names.

(Specifying Regarding "example.jp" at Point in Time of Jul. 2, 2020)

Finally, an example of specifying regarding "example.jp" at a point in time of Jul. 2, 2020 in serial number 4 in FIG. 9 will be described.

For example, referring to the DNS data set in FIG. 5, "example.jp" has the domain parking NS records "ns.parking.example" and "ns.parking2.example" set on Jul. 1, 2020.

Referring to the registration information of the domain name in FIG. 6, "example.jp" is registered on Jun. 30, 2020, and is not expired at a point in time of Jul. 2, 2020. Therefore, the specifying device 10 determines that only a single life cycle (single registration period) needs to be considered for "example.jp".

Further, referring to the blacklist of domain names in FIG. 7, "example.jp" has no history of malicious use.

From the above information, the specifying device 10 determines that the time-series pattern of the operation form of "example.jp" corresponds to the time-series pattern used only for domain parking (pattern 1 illustrated in FIG. 1).

Referring to the registration information of the domain name in FIG. 6, re-registration of the domain name of "example.jp" has not occurred. Therefore, the specifying device 10 determines that "example.jp" does not correspond to the time-series pattern (time-series pattern in a plurality of registration periods) of the operation form before and after the re-registration of the domain name as illustrated in FIG. 2.

Further, referring to the DNS data set in FIG. 5, "example.jp" uses domain parking of a plurality of operators at a point in time of Jul. 1, 2020. From this, the specifying device 10 determines that "example.jp" corresponds to, for example, patterns A and B in FIG. 3.

(Specifying Regarding "example.jp" after Jul. 3, 2020)

Further, the specifying device 10 specifies an applicable time-series pattern with respect to the operation form of "example.jp" after Jul. 3, 2020. As described above, "example.jp" is used for domain parking since Jul. 1, 2020. Therefore, the specifying device 10 specifies candidates for the applicable time-series pattern as patterns 2, 4, and 7 in FIG. 1 with respect to the operation form from Jul. 3, 2020 to the expiration of the domain name.

The specifying device 10 determines that a possibility that "example.jp" will change to the operation form of malicious use after Jul. 3, 2020 is relatively "high" on the basis of a result of the specifying. Therefore, the specifying device 10 determines that it is necessary to confirm whether or not "example.jp" is a malicious domain name more frequently than other domain names.

As described above, the specifying device 10 specifies domain names (for example, example.com and example.jp) having a relatively high possibility that the plurality of domain names of serial numbers 1 to 4 in FIG. 9 will change to the operation form of malicious use. The specifying device 10 performs control, for example, so that it is confirmed whether or not the specified domain name is a malicious domain with a higher frequency than other domain names (for example, example.net and example.org). This makes it possible for the specifying device 10 to find an unknown malicious domain name more efficiently with limited calculation resources.

For a preferential calculation resource allocation method, known methods such as task control, resource allocation, and job management, which are generally used in information engineering or programming languages, can be used.

(System Configuration, or Like)

Further, respective components of each of the illustrated devices are functionally conceptual ones, and are not necessarily physically configured as illustrated in the figures. That is, a specific form of distribution and integration of the respective devices is not limited to the form illustrated in the drawings, and all or some of the devices can be distributed or integrated functionally or physically in any units according to various loads, and use situations. Further, all or some of processing functions to be performed in each of the devices can be realized by a central processing unit (CPU) and a program executed by the CPU, or can be realized as hardware using a wired logic.

Further, all or some of the processing described as being performed automatically among the processing described in the embodiment can be performed manually, and alternatively, all or some of the processing described as being performed manually can be performed automatically using a known method. In addition, information including the processing procedures, control procedures, specific names, and various types of data or parameters illustrated in the above literature or drawings can be arbitrarily changed unless otherwise described.

(Program)

The specifying device 10 described above can be implemented by installing a program as package software or online software in a desired computer. For example, the information processing device is caused to execute the above program, making it possible to cause the information processing device to function as the system of each embodiment. Here, the information processing device includes a desktop or laptop personal computer. Further, a mobile communication terminal such as a smart phone, a mobile phone, or a personal handyphone system (PHS), or a slate terminal such as a personal digital assistant (PDA), for example, is included in a category of the information processing device.

Further, the specifying device of the embodiment can be implemented as a server device in which a terminal device used by a user is a client and a service regarding the above processing is provided to the client. In this case, the server device may be implemented as a Web server, or may be implemented as a cloud that provides services regarding the above processing through outsourcing.

FIG. 9 is a diagram illustrating an example of a computer that executes a specific program. A computer 1000 includes, for example, a memory 1010 and a CPU 1020. The computer 1000 also includes a hard disk drive interface 1030, a disc drive interface 1040, a serial port interface 1050, a video adapter 1060, and a network interface 1070. Each of these units is connected by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disc drive interface 1040 is connected to a disc drive 1100. For example, a removable storage medium such as a magnetic disk or an optical disc is inserted into the disc drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and a program data 1094. That is, a program that defines each processing executed by the system of each embodiment is implemented as the program module 1093 in which a code that can be executed by a computer is described. The program module 1093 is stored in, for example, the hard disk drive 1090. For example, the program module 1093 for executing the same processing as that of a functional configuration in the system of each embodiment is stored in the hard disk drive 1090. The hard disk drive 1090 may be replaced with an SSD.

Further, the pattern information used in the processing of the above-described embodiment is stored as the program data 1094 in, for example, the memory 1010 or the hard disk drive 1090. The CPU 1020 reads the program module 1093 or the program data 1094 stored in the memory 1010 or the hard disk drive 1090 into the RAM 1012 as necessary, and executes the processing of the embodiment.

The program module 1093 or the program data 1094 is not limited to being stored in the hard disk drive 1090 and, for example, may be stored in a detachable storage medium and read by the CPU 1020 via the disc drive 1100 or the like. Alternatively, the program module 1093 and the program data 1094 may be stored in another computer connected via a network (a local area network (LAN), a wide area network (WAN), or the like). The program module 1093 and the program data 1094 may be read by the CPU 1020 from another computer via the network interface 1070.

REFERENCE SIGNS LIST

10 Specifying device
11 Input unit
12 Storage unit
13 Control unit
14 Output unit
111 DNS data set input unit
112 Domain name registration information input unit
113 Domain name blacklist input unit
131 First specifying unit
132 Second specifying unit
133 Third specifying unit
134 Determination unit

The invention claimed is:

1. A determination device comprising:
a processing circuitry configured to
receive an input of time-series information indicating an operation form of a domain name up to a predetermined date and time in time series;
specify whether a time-series change in the operation form of the domain name corresponds to any of patterns shown in pattern information based on the time-series information of the domain name and the pattern information indicating patterns of time-series changes in the operation form of the domain name, and specify candidates for the operation form of the domain name after the predetermined date and time based on a specified pattern corresponding to the time-series change in the operation form of the domain name;
determine a possibility that the operation form of the domain name will change to malicious use based on the specified candidates for the operation form of the domain name after the predetermined date and time, the operation form of a domain name includes whether or not the domain name is used maliciously and whether or not the domain name is used for domain parking;
continuously update, in real time, a blacklist to include the domain name when the domain name is determined to be used maliciously; and
perform at least one of web filtering or domain name filtering based on the blacklist after being updated to include the domain name that is determined to be used maliciously.

2. The determination device according to claim 1,
wherein the time-series information of the domain name further includes
information indicating a period in which the domain name is re-registered after the domain name expires,
the pattern information further includes
information indicating a pattern of the operation form of the domain name in a period before and after the re-registration of the domain name, and
the processing circuitry, to specify whether the time-series change in operation form of the domain name corresponds to any of the patterns shown in the pattern information, is further configured to
specify whether or not a change in operation form in the period before and after the re-registration of the input domain name corresponds to any of patterns shown in the pattern information in response to determination that the domain name has been re-registered based on the time-series information of the domain name, and specify the candidates for the operation form of the domain name after the predetermined date and time based on the specified pattern.

3. The determination device according to claim 1,
wherein the time-series information of the domain name further includes
information indicating host names of one or more name servers used for the operation of the domain name in time series;
the pattern information further includes
information indicating a pattern of time-series changes in operation form in a case in which the domain name is operated at a same time or while switching between a plurality of name servers, and
the processing circuitry, to specify whether the time-series change in operation form of the input domain name corresponds to any of the patterns shown in the pattern information, is further configured to
specify whether or not a change in operation form in a period before and after re-registration of the domain name corresponds to a pattern shown in the pattern information based on the pattern information in response to determination that the domain name has been re-registered on the basis of the time-series information of the input domain name, and specify the candidates for the operation form of the domain name after the predetermined date and time based on the specified pattern.

4. A method executed by a determination device, the method comprising:

receiving an input of time-series information indicating an operation form of a domain name up to a predetermined date and time in time series;

specifying whether a time-series change in the operation form of the domain name corresponds to any of patterns shown in pattern information based on the time-series information of the domain name and the pattern information indicating patterns of time-series changes in the operation form of the domain name, and specifying candidates for the operation form of the domain name after the predetermined date and time based on a specified pattern corresponding to the time-series change in the operation form of the domain name;

determining is a possibility that the operation form of the domain name will change to malicious use based on the specified candidates for the operation form of the domain name after the predetermined date and time, the operation form of a domain name includes whether or not the domain name is used maliciously and whether or not the domain name is used for domain parking;

continuously updating, in real time, a blacklist to include the domain name when the domain name is determined to be used maliciously; and performing at least one of web filtering or domain name filtering based on the blacklist after being updated to include the domain name that is determined to be used maliciously.

5. A non-transitory computer readable storage medium having stored therein a determination program for causing a computer to execute a process comprising:

receiving an input of time-series information indicating an operation form of a domain name up to a predetermined date and time in time series;

specifying whether a time-series change in the operation form of the domain name corresponds to any of patterns shown in pattern information based on the time-series information of the domain name and the pattern information indicating patterns of time-series changes in the operation form of the domain name, and specifying candidates for the operation form of the domain name after the predetermined date and time based on a specified pattern corresponding to the time-series change in the operation form of the domain name;

determining a possibility that the operation form of the domain name will change to malicious use based on the specified candidates for the operation form of the domain name after the predetermined date and time, the operation form of a domain name includes whether or not the domain name is used maliciously and whether or not the domain name is used for domain parking;

continuously updating, in real time, a blacklist to include the domain name when the domain name is determined to be used maliciously; and performing at least one of web filtering or domain name filtering based on the blacklist after being updated to include the domain name that is determined to be used maliciously.

* * * * *